United States Patent

Orzelski

(10) Patent No.: US 8,033,609 B2
(45) Date of Patent: Oct. 11, 2011

(54) HEAD RESTRAINT

(75) Inventor: Zbigniew J. Orzelski, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 21 days.

(21) Appl. No.: 12/501,033

(22) Filed: Jul. 10, 2009

(65) Prior Publication Data

US 2009/0267400 A1    Oct. 29, 2009

Related U.S. Application Data

(62) Division of application No. 11/553,551, filed on Oct. 27, 2006, now abandoned.

(51) Int. Cl.
  *B60N 2/48* (2006.01)
  *A47C 7/36* (2006.01)
(52) U.S. Cl. .................... 297/391; 297/452.57
(58) Field of Classification Search ............ 297/391, 297/452.56, 452.57, 452.13, 452.63, 452.64, 297/216.12
  See application file for complete search history.

(56) References Cited

U.S. PATENT DOCUMENTS

| | | |
|---|---|---|
| 3,114,527 A | 12/1963 | Demarest |
| 3,129,975 A | 4/1964 | Emery |
| 4,227,740 A | 10/1980 | East |
| 4,607,887 A * | 8/1986 | Vail ................ 297/452.26 |
| 4,779,928 A | 10/1988 | Collier et al. |
| 5,121,969 A | 6/1992 | Schroeder |
| 5,378,040 A * | 1/1995 | Chaney et al. ........... 297/338 |
| 5,393,126 A * | 2/1995 | Boulva ............. 297/452.56 |
| 6,213,548 B1 | 4/2001 | Van Wynsberghe et al. |
| 6,478,381 B1 * | 11/2002 | Cramb et al. ......... 297/452.13 |
| 6,676,218 B2 * | 1/2004 | Fujita et al. ......... 297/452.49 |
| 6,722,742 B2 * | 4/2004 | Potes et al. .......... 297/452.56 |
| 6,824,211 B2 | 11/2004 | Bayer et al. |
| 6,863,343 B2 | 3/2005 | Pal et al. |
| 6,893,094 B2 | 5/2005 | O'Connor |
| 7,108,330 B2 * | 9/2006 | Mizelle et al. ........ 297/452.57 |
| 7,303,237 B1 | 12/2007 | Hughes |
| 2003/0085607 A1* | 5/2003 | Jones et al. ........... 297/452.56 |
| 2004/0195894 A1 | 10/2004 | Pal et al. |
| 2005/0127734 A1 | 6/2005 | Veine et al. |
| 2005/0140198 A1 | 6/2005 | Ashton et al. |
| 2007/0257537 A1 | 11/2007 | Asbury |

* cited by examiner

*Primary Examiner* — David Dunn
*Assistant Examiner* — Tania Abraham
(74) *Attorney, Agent, or Firm* — Gregory Brown Brooks Kushman, P.C.

(57) ABSTRACT

A head restraint assembly for use with a vehicle seat, the head restraint assembly having a head restraint armature that is adapted to be attached to a seat back, including two spaced apart support posts, a cushion surrounding the head restraint armature and a strap that is affixed to the head restraint armature, the strap extending between the two spaced apart support posts. The strap is surrounded by the cushion.

4 Claims, 7 Drawing Sheets

HEAD RESTRAINT

CROSS-REFERENCE TO RELATED APPLICATIONS

This application is a division of U.S. application Ser. No. 11/553,551 filed Oct. 27, 2006.

BACKGROUND OF THE INVENTION

1. Field of the Invention

This invention relates to head restraint assemblies for use with vehicle seat assemblies.

2. Background Art

Because of concern for the safety of vehicle occupants, vehicles have traditionally been the subject of extensive government regulation. Such regulations set forth standards with which the vehicle and/or its components must comply. One component that has been the subject of regulation is the vehicle head restraint assembly.

FMVSS-202a prescribes a minimum "backset retention" for a head restraint assembly. The backset retention test prescribed by FMVSS-202a requires that a head restraint assembly be able to withstand a specified level of force without experiencing a greater than a specified displacement. Current head restraint assemblies having only a head restraint armature and a foam cushion may be unable to satisfy the requirements of FMVSS-202a because of the deformation experienced by the foam cushion upon the application of the specified force. Applicants' invention presents a solution to this potential problem.

SUMMARY OF THE INVENTION

Under the invention, a new head restraint assembly for use with a vehicle seat is provided. In a first embodiment, a head restraint armature that is adapted to be attached to a seat back is provided. The head restraint armature includes two spaced apart support posts. A cushion is provided surrounding the head restraint armature. Additionally, a strap is affixed to the head restraint armature. The strap extends between the two spaced apart support posts and is surrounded by the cushion.

In at least one implementation of the first embodiment, the strap defines a closed loop having opposing sides. The strap is affixed to the head restraint armature such that the strap wraps around at least a portion of each support post. In at least another implementation, at least one of the support posts has a notch and the strap has a protrusion that cooperates with the notch to secure the strap.

In at least another implementation of the first embodiment, the armature includes an adjoining portion that adjoins the two spaced apart support posts and the strap has a saddle portion extending between the opposing sides of the strap. In at least one variation of this implementation, an underside of the saddle portion rests against a top portion of the adjoining portion of the armature when the strap is affixed to the head restraint armature. In at least another variation of this implementation, the saddle portion includes a protrusion that holds the strap in place on the armature.

In at least another implementation of the first embodiment, the strap is made from a material comprising plastic. In at least one such implementation, the plastic comprises polypropylene. In at least one variation of this implementation, the plastic comprises glass filled polypropylene. In at least another variation of this implementation, the ratio of polypropylene to glass is approximately 4 to 1.

In at least another implementation of the first embodiment, the strap is in the general shape of a crescent when viewed from above a top portion of the strap prior to mounting the strap to the support posts. In this implementation, the strap is in tension when the strap is mounted to the two support posts. In at least one variation of this implementation, the strap is orientated so as to be concave with respect to a front portion of the cushion.

In at least another implementation of the first embodiment, the strap has a thickness of approximately two millimeters.

In at least another implementation of the first embodiment, the armature includes an adjoining portion that adjoins the two support posts and a top portion of the strap is positioned approximately 50 millimeters below the adjoining portion.

In a second embodiment, a strap is provided for use with a vehicle seat head restraint assembly having an armature, the armature having two spaced apart support posts and an adjoining portion that adjoins the two support posts. The strap comprises a band generally defining a closed loop having opposing sides. The band also has a protrusion. In this embodiment, the band is mountable to the two posts and securable to the head restraint assembly by cooperation of the protrusion with a notch in the armature.

In at least one implementation of the second embodiment, the band has a saddle portion extending between a top portion of the opposing sides of the band. In a variation of this implementation, the protrusion is disposed on the saddle portion, the protrusion being capable of cooperating with the adjoining portion to secure the band to the adjoining portion when the band is mounted to the two posts. In at least one variation of this implementation, the band is made from a material comprising polypropylene. In a further variation, the band is made from a material comprising glass filled polypropylene wherein the ratio of polypropylene to glass is 4 to 1.

In a third embodiment, a strap in combination with an automotive seat head restraint assembly is provided. In this embodiment, the combination comprises a head restraint assembly having two posts that are substantially upright, rigid, spaced apart and oriented along substantially parallel axes and a rigid joining member that is oriented substantially traverse to the two posts, the rigid joining member rigidly connecting the two posts. The combination further comprises a band generally defining a closed loop having opposing sides, the band being made from a material comprising plastic, the band having a top portion and an integral saddle portion extending between the top portion of the opposing sides of the band. The band is mounted to the head restraint assembly such that the band wraps around a portion of each of the two posts and the saddle portion wraps around a portion of the rigid joining member. The saddle portion includes a plurality of protrusions that cooperate with the rigid joining member to hold the band in place on the rigid joining member. In this embodiment, a foam cushion having a front portion envelops both the band and the rigid joining member.

In at least one implementation of the third embodiment, the band is generally in the shape of a crescent when viewed from above the top portion prior to mounting the band to the head restraint assembly. In this implementation, the band is placed in tension when the band is mounted to the two posts. In this implementation, the band and the extension are made from a material comprising glass filled polypropylene with a ratio of polypropylene to glass is 4 to 1.

DETAILED DESCRIPTION OF THE PREFERRED EMBODIMENT(S)

Reference will now be made in detail to the illustrated embodiments of the present invention which constitute the best modes of practicing the invention presently known to the inventor. The following descriptions are merely exemplary in nature and are in no way intended to limit the invention, its application, or uses. The figures are not necessarily drawn to scale. Therefore, specific details disclosed therein are not to be interpreted as limiting, but merely as a representative basis for any aspect of the invention and/or as a representative basis for teaching one skilled in the art to variously employ the present invention.

Figure 1:
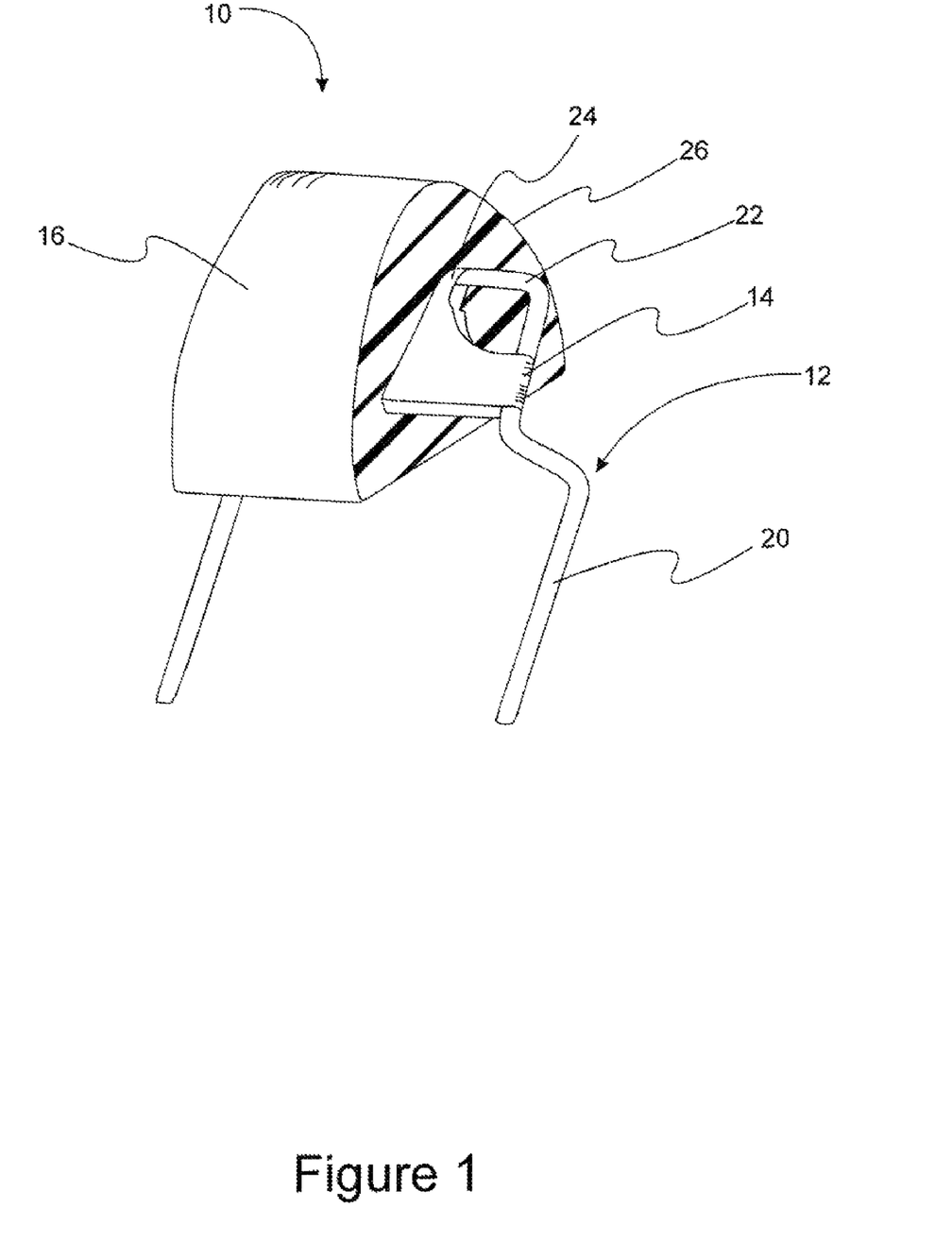
FIG. 1 is a cutaway perspective view of an embodiment of a headrest assembly made in accordance with the present invention.

As best shown in FIG. 1, at least one embodiment of the present invention includes a head restraint assembly 10 for use with a seat assembly (not shown) mounted to a vehicle (not shown). While head restraint assembly 10 may be used in any vehicle including boats, airplanes, and trains, in a preferred embodiment, head restraint assembly 10 is used in an automobile. As illustrated in FIG. 1, head restraint assembly 10 comprises a head restraint armature 12, a strap or band 14, and a cushion 16. Head restraint assembly 10 may be mounted to an automobile seat assembly and positioned behind the head of an occupant.

In the embodiment illustrated in FIG. 1, head restraint armature 12 provides structural support to head restraint assembly 10. Head restraint armature 12 can be made from any rigid material, such as metal, that is resilient to the application of forces such as those exerted by an occupant's head during a rear end collision. Metals suitable for use in the head restraint armature 12 include carbon steel, stainless steel, aluminum alloys, and in a preferred embodiment, high strength low alloy steel.

Head restraint armature 12 includes two support posts 18, 20. In the illustrated embodiment, the two support posts 18, 20 are spaced apart and are substantially parallel to one another. The head restraint assembly 10 may be mounted to a vehicle seat back by inserting a portion of the support posts 18, 20 within cavities in the vehicle seat back (not shown). In some embodiments, the portions of support posts 18, 20 that are received within a vehicle seat back may have notches that cooperate with the vehicle seat back to allow the head restraint assembly to be adjustable up and down with respect to the vehicle seat back. In other embodiments, the head restraint assembly 10 is not adjustable. In some embodiments, head restraint assembly 10 is bolted, welded, and/or otherwise affixed to the seat back.

Figure 2:
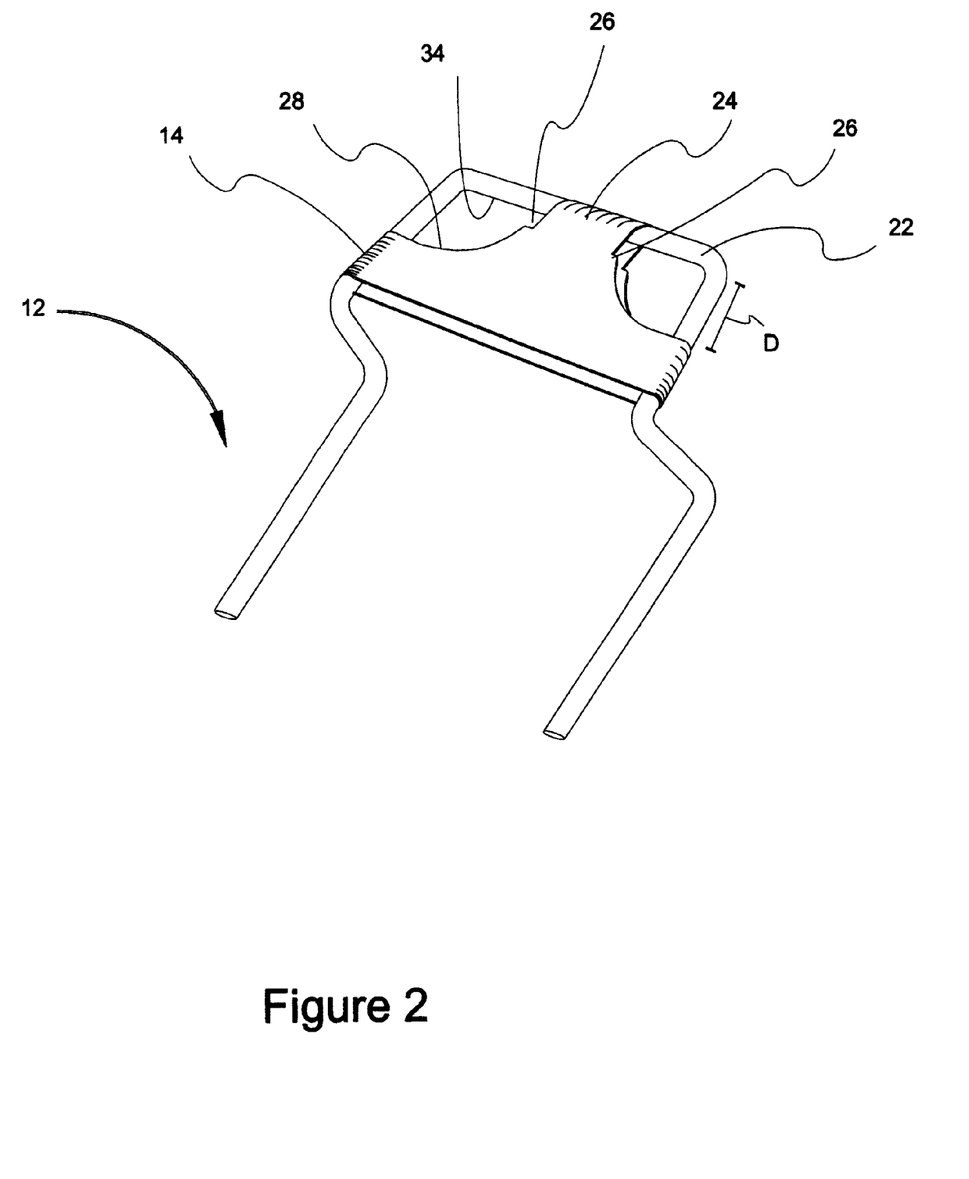
FIG. 2 is a perspective view of a head restraint armature and a head restraint strap of the head restraint assembly of FIG. 1.

In the illustrated embodiment, the support posts 18, 20 extend upward into the cushion 16 and support cushion 16 on the vehicle seat assembly. As shown in FIGS. 1 and 2, the support posts 18, 20 are connected by an adjoining portion 22. In the illustrated embodiment, adjoining portion 22 is integral with the two support posts 18, 20. In other embodiments, the adjoining portion 22 may be connected to the support posts, 18, 20, with nuts, bolts, a weld, or any other mechanism or method effective to rigidly connect the two support posts, 18, 20 to each other.

Figure 3:
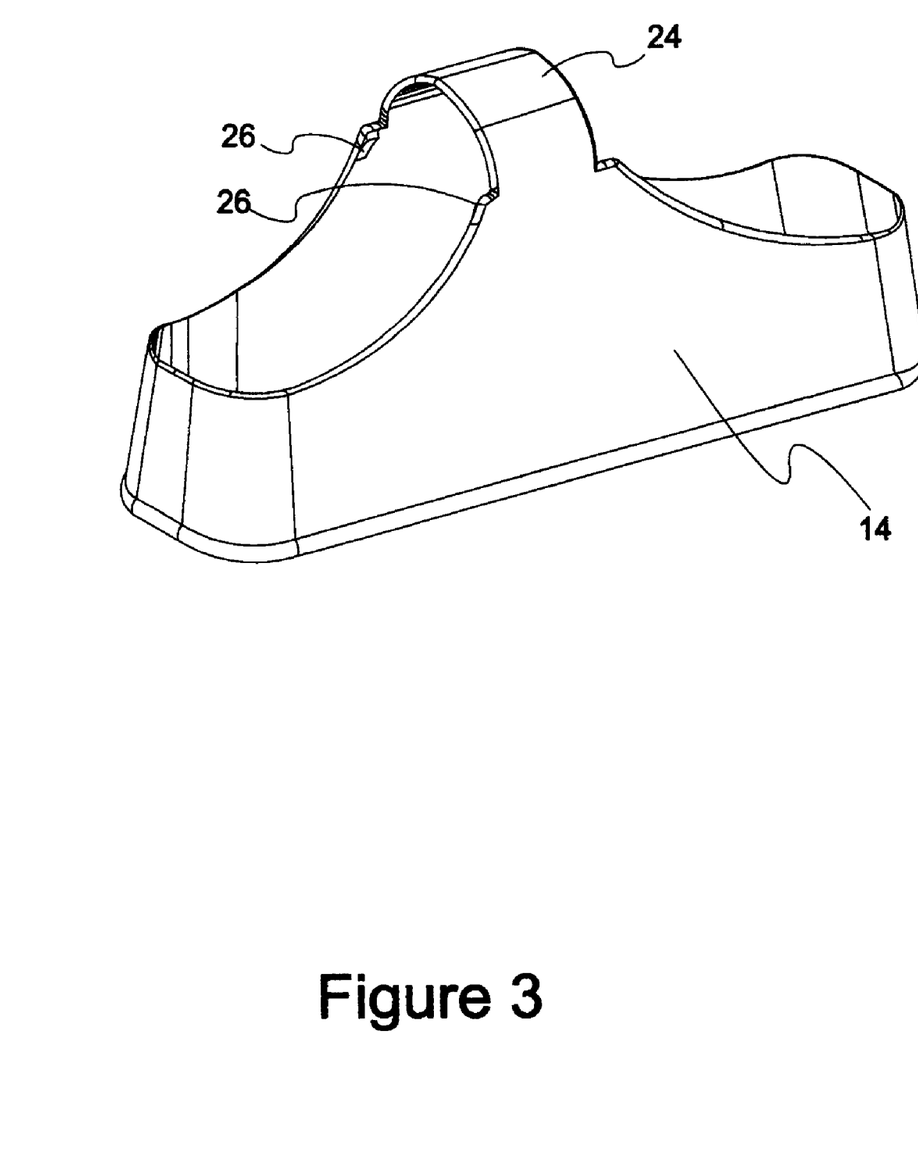
FIG. 3 is a perspective view of the head restraint strap of FIG. 1.

As illustrated, strap 14 is a closed loop (this is best illustrated in FIG. 3). As shown in FIGS. 1 and 2, the strap 14 is affixed to the head restraint armature 12 such that it wraps around a portion of the two support posts 18, 20. In the embodiment of the strap 14 illustrated in FIGS. 1-5, a saddle portion 24 extends upward from, and adjoins, opposing sides of strap 14. In the illustrated embodiment, saddle portion 24 is integral with strap 14. In other embodiments, the saddle portion 24 may be made separately from strap 14 and then attached to strap 14 using epoxy, fasteners or any other mechanism or method effective to join the saddle portion 24 to strap 14.

The strap 14 may be made from a material comprising plastic. The plastic material may comprise polypropylene. The plastic material may comprise glass filled polypropylene. In a preferred embodiment, the strap is made from a material comprising glass filled polypropylene wherein the ratio of polypropylene to glass is 4 to 1. The strap 14 may be manufactured by a variety of processes including extrusion, injection molding, blow molding, bonding, or fastening to form a strap.

As illustrated in FIG. 1, cushion 16 envelops the head restraint armature 12 and the strap 14. The cushion 16 may be made from any material effective to cushion an occupant's head and is preferably made from a foam. In a preferred embodiment, the strap 14 is positioned on the head restraint armature 12 and the assembly is then placed in a mold into which foam is introduced. The loop configuration of strap 14 permits the foam to flow freely throughout the mold including the area between the opposing sides of the strap 14. The foam in the mold envelops a portion of the two support posts 18, 20, the adjoining portion 22 and the strap 14. In a preferred embodiment the foam is a polyurethane foam. In other embodiments, the foam may be expandable polypropylene or expandable polyethylene.

Figure 4:
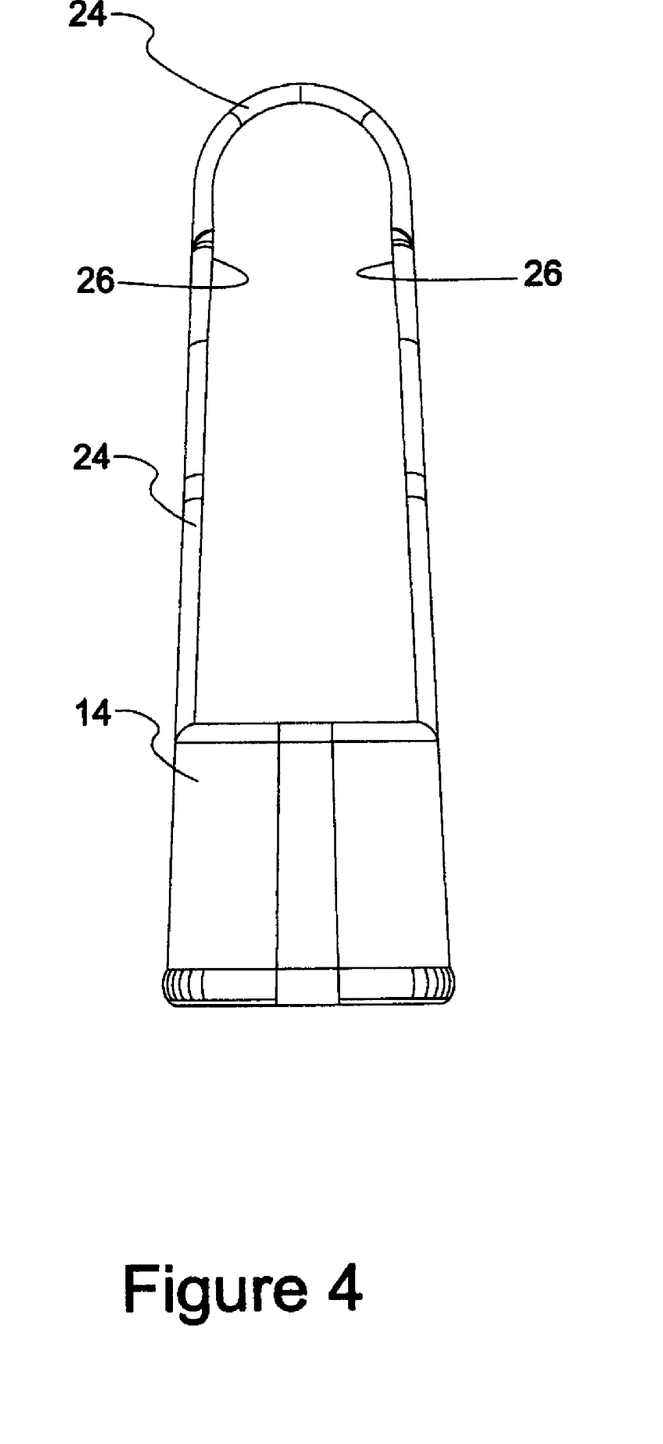
FIG. 4 is a side elevational view of the head restraint strap of FIG. 1.
Figure 5:
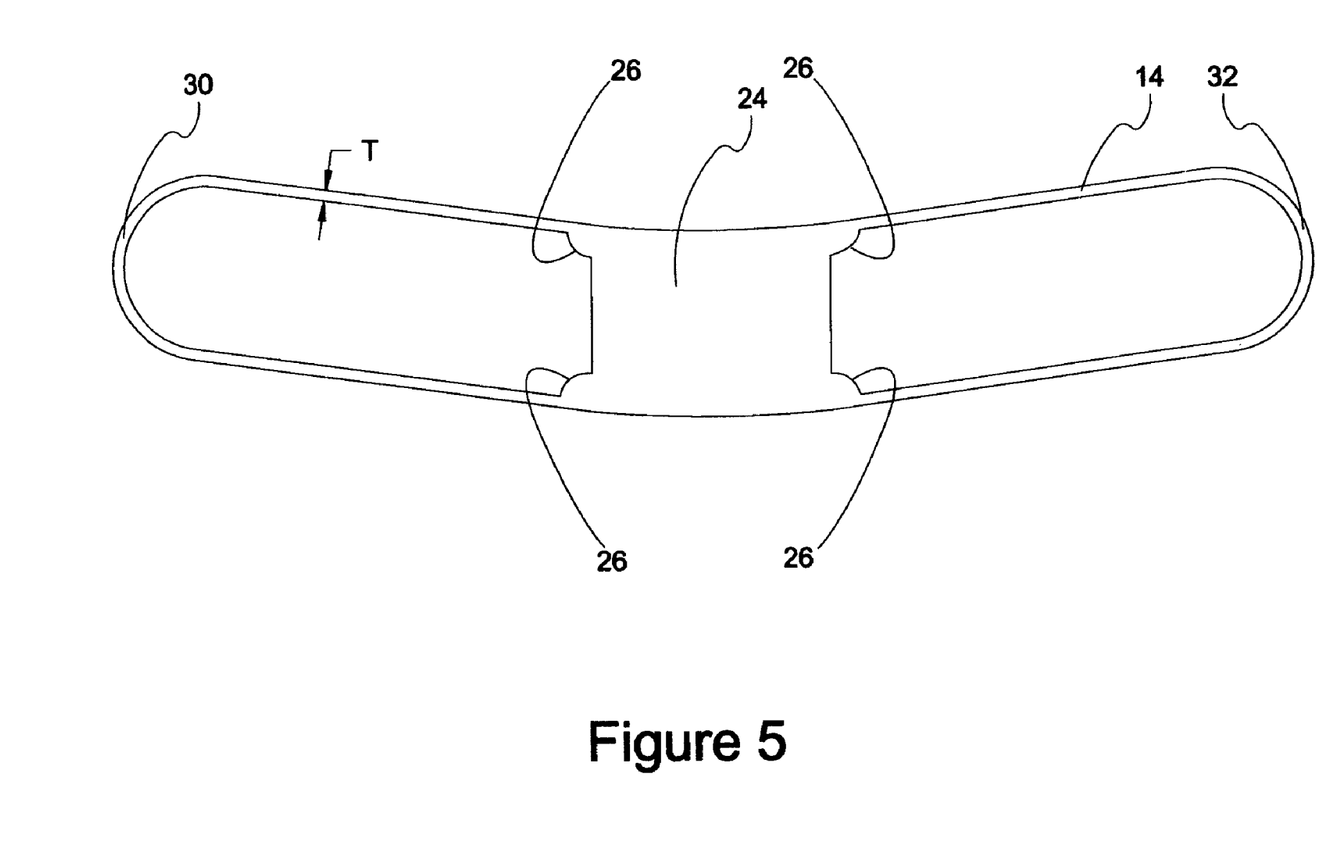
FIG. 5 is a plan view of the head restraint strap of FIG. 1.

FIG. 2 depicts a head restraint armature 12 and the strap 14 of FIG. 1 without the cushion 16. As shown in FIG. 2, strap 14 wraps around both support posts 18, 20. Protrusions 26 are disposed on the saddle portion 24 of strap 14. In other embodiments, protrusions may be disposed along other portions of the strap 14. Protrusions 26 (as best illustrated in FIGS. 3 and 4) hold strap 14 in position on the head restraint armature 12 by cooperating with the adjoining portion 22. Protrusions 26 form a physical obstruction that contacts the adjoining portion 22 when strap 14 is mounted on head restraint armature 12 and that hold strap 14 on head restraint armature 12 in a snap fit or inference fit. In some embodiments, protrusions 26 may snugly and securely hold strap 14 in position on head restraint armature 12. In other embodiments, protrusions 26 may be configured to loosely hold strap 14 in position on head restraint armature 12. Protrusion 26 may be integrally molded into saddle portion 24 or may be separately manufactured and attached by any means effective to secure protrusions 26 to the saddle portion 24.

As best illustrated in FIG. 3, saddle portion 24 extends upwardly from opposite sides of the strap 14 to join opposing sides of strap 14. In the embodiment illustrated in FIG. 3, the saddle portion 24 is centered on the strap 14. In other embodiments, the saddle portion 24 may be off center. In other embodiments, the saddle portion 24 may join opposing but not opposite sides of strap 14. In other embodiments, the strap 14 may have a plurality of saddle portions 24.

FIG. 4 illustrates a side view of the strap 14. This view best shows the configuration of protrusions 26 as protruding inwardly from opposite sides of the saddle portion 24. As the strap 14 is positioned over the head restraint armature 12, the adjoining portion 22 would protrude through the interior portion of the strap 14, until it comes into contact with protrusions 26. At that time, additional force may be needed to permit the adjoining portion 22 to push past the protrusions 26, thereby allowing the strap 14 to be properly seated and restrained on the head restraint armature 12.

With the strap 14 mounted on the head restraint armature 12 and embedded within the cushion 16, the strap 14 is positioned in the path of an occupant's head as it moves rearward during a rear end collision. In this position, the strap 14 may transfer some of the forces exerted during a collision from the cushion 16 to the head restraint armature 12. In a preferred embodiment, the top portion 28 of the strap 14 is positioned approximately 50 millimeters below the bottom portion 34 of the adjoining portion 22 (illustrated as distance D in FIG. 2).

In a preferred embodiment, there is a bend through the approximate center of the strap 14 such that, when viewed from above, the strap 14 is in the general shape of a crescent. (See FIG. 5.) The bend in the center of strap 14 has the effect of moving the far ends 30, 32 of the strap 14 closer together. The far ends 30, 32 must be stretched slightly apart to allow the strap 14 to be positioned on the head restraint armature 12, which has the effect of slightly stretching and/or straightening strap 14 as it is placed over the head restraint armature 12. This stretching and/or straightening causes the strap 14 to undergo tension. The angle of the strap 14 has the effect of enhancing the strap's 14 ability to transfer forces from the cushion 16 to the head restraint armature 12 during a collision. In a preferred embodiment, the crescent shaped strap 14 will be placed on the head restraint armature 12 such that the strap 14 is concave with respect to a front portion of the cushion 16.

While the strap 14 may have any suitable thickness, in a preferred embodiment, the strap 14 will have a thickness T (see FIG. 5) of between 1.85 and 2.15 millimeters and in a most preferred embodiment, the strap 14 will have a thickness T of approximately 2 millimeters.

Figure 6:
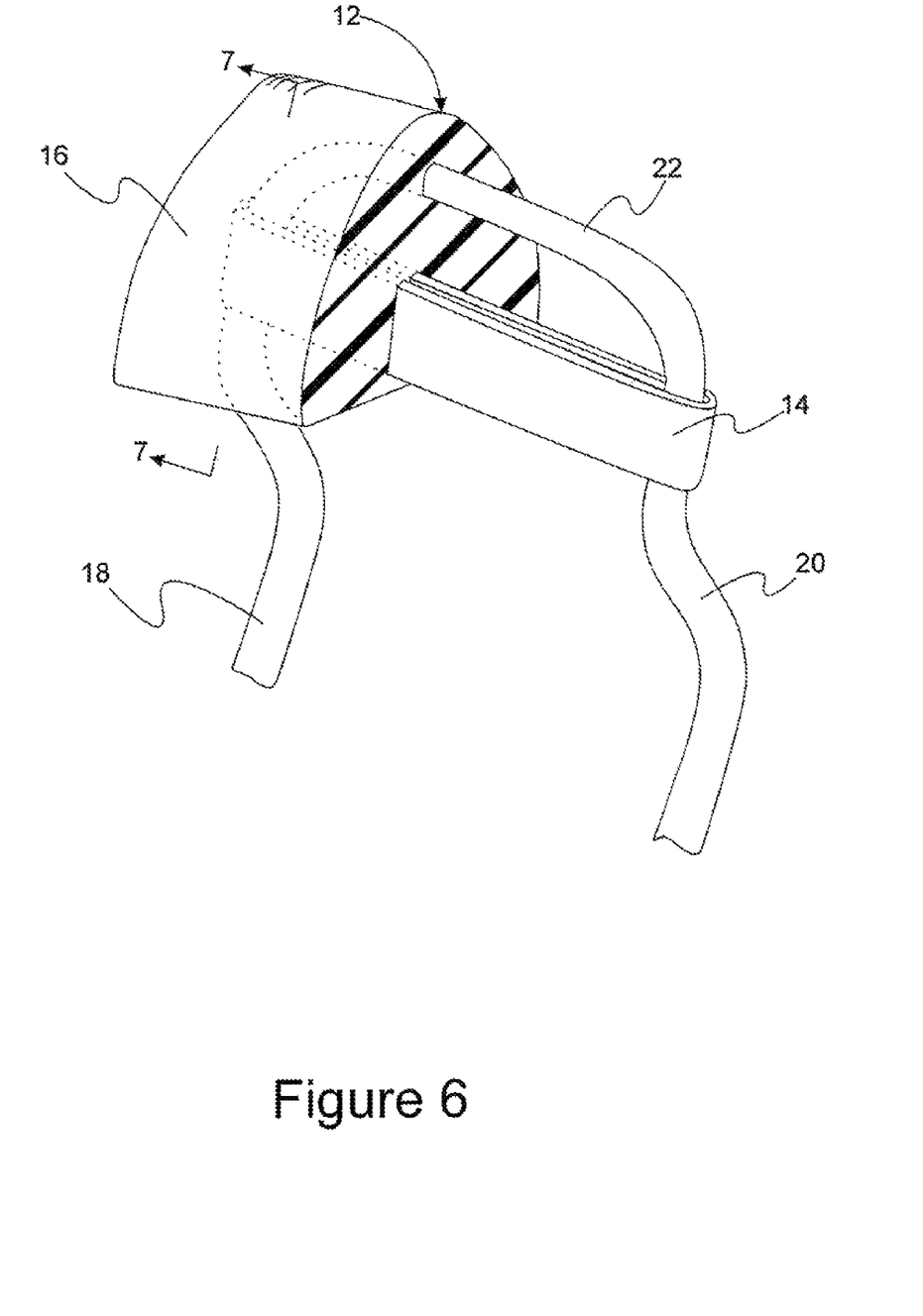
FIG. 6 is a perspective view of an alternative embodiment of a head restraint strap made in accordance with the present invention.
Figure 7:
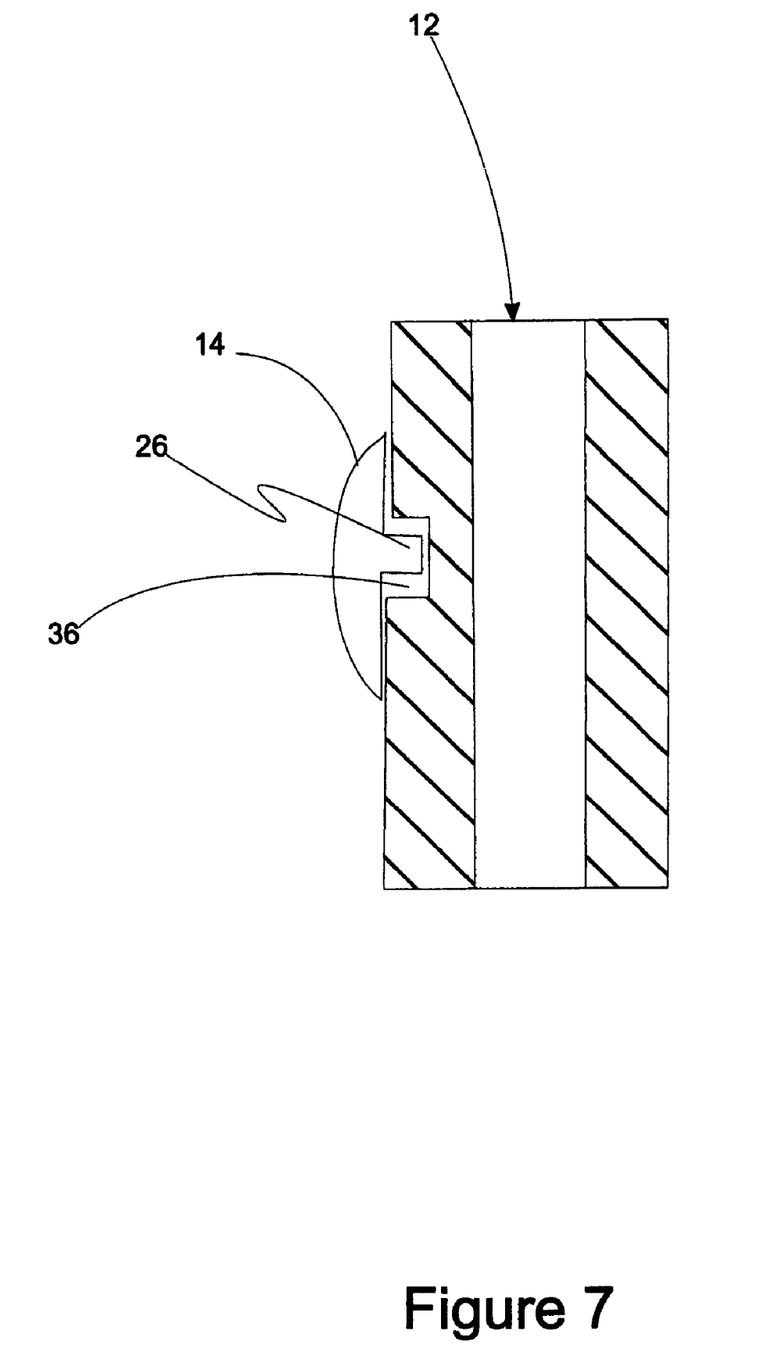
FIG. 7 is a cross sectional view taken along the line 7-7 of FIG. 6.

An alternative embodiment of strap 14 is shown in FIGS. 6 and 7. In this embodiment, the strap 14 does not have the saddle portion 24. Rather, the head restraint armature 12 has at least one notch 36 at an upper part of the head restraint armature 12 that cooperates with the protrusions 26 of the strap 14 to retain the strap 14 in position on the head restraint armature 12. This configuration is best shown in FIG. 7. When attaching the embodiment of the strap 14 depicted in FIGS. 6 and 7 to the head restraint armature 12, the strap 14 is placed over the top of the head restraint armature 12 and pushed downward until protrusion 26 snaps into notch 36. The notch 36 may be located at any point around the perimeter of the head restraint armature 12 that comes into contact with the strap 14, and is preferably located at an outboard position to facilitate assembly.

This invention has many advantages and attributes. Some embodiments of the present invention may completely satisfy the requirements of FMVSS-202a while other embodiments may simply provide added strength and resistance.

While the best mode for carrying out the invention has been described in detail, those familiar with the art to which this invention relates will recognize various alternative designs and embodiments for practicing the invention as defined by the following claims.

What is claimed:

1. A head restraint assembly for a vehicle seat back comprising:
    an armature attached to a seat back, the armature including two posts that are substantially upright, spaced apart and oriented along substantially parallel axes;
    a band generally defining a closed loop having a front side and a back side that both extend between the two posts, the band being attached to two posts of the head restraint assembly such that the band extends around a portion of each of the two posts, a protrusion is formed in the band that is received by at least one of the posts to align the band with the armature; and
    a foam cushion enveloping the band and at least part of the armature, wherein the foam cushion holds the band in engagement with at least a portion of the armature and the band reinforces the cushion, and wherein the cushion is molded around at least a portion of the armature, and wherein the cushion is molded over and between the front and back sides of the band.

2. The head restraint assembly of claim 1 wherein at least one of the posts defines a notch, wherein the protrusion is received in the notch to secure the band to the armature.

3. The head restraint assembly of claim 1 wherein the armature further includes a rigid adjoining member connecting the two posts.

4. The head restraint assembly of claim 3 wherein the cushion is molded around at least a portion of the adjoining member.

* * * * *